United States Patent [19]

Barthel

[11] 4,287,720
[45] Sep. 8, 1981

[54] CRYOGENIC LIQUID CONTAINER

[75] Inventor: Alfred Barthel, Indianapolis, Ind.

[73] Assignee: Union Carbide Corporation, New York, N.Y.

[21] Appl. No.: 96,407

[22] Filed: Nov. 21, 1979

[51] Int. Cl.³ .............................................. F17C 1/00
[52] U.S. Cl. ............................................ 62/45; 62/3
[58] Field of Search .................. 62/3, 45, 332, 457, 62/514 R, 324

[56] References Cited

U.S. PATENT DOCUMENTS

| | | | |
|---|---|---|---|
| 3,007,596 | 11/1961 | Matsch | 62/45 |
| 3,009,601 | 11/1961 | Matsch | 62/45 |
| 3,018,016 | 1/1962 | Hnilicka, Jr. | 62/45 |
| 3,133,422 | 5/1964 | Paivanas et al. | 62/50 |
| 3,145,515 | 8/1964 | Clapsadle | 62/45 |
| 3,265,236 | 8/1966 | Gibbon et al. | 62/45 |
| 3,341,052 | 9/1967 | Barthel | 62/45 |
| 3,823,567 | 7/1974 | Corini | 62/3 |
| 3,866,785 | 2/1975 | Conte | 62/54 |
| 3,930,375 | 1/1976 | Hofman | 62/45 |
| 4,055,268 | 10/1977 | Barthel | 62/45 |
| 4,107,934 | 7/1978 | Beitner | 62/3 |

OTHER PUBLICATIONS

Whiting et al.: "Thermoelectric Devices for Space and Remote Terestial Sites," *Mechanical Engineering;* 8/1970, pp. 27-31.
Kuo: "Heat Pumping by Thermoelectric Coolers Through a Low-Temp. Heat Pipe;" XIII Int'l Congress of Refrig., Wash. D.C. 8/30, 31/71.
Van Nostrand's *Scientific Encyclopedia,* Fifth Edition, 1976, "Thermoelectric Cooling," pp. 2188, 2189.
*Temp. Control by Thermoelectrics for Science and Industry,* Cambion, Cambridge Thermionic Corp., 1974.
*The Where and Why of Thermoelectric Cooling;* Boesen et al.; Borg Warner Corp., 1967.

*Primary Examiner*—Ronald C. Capossela
*Attorney, Agent, or Firm*—John J. Kelly, Jr.

[57] ABSTRACT

An evacuable double-walled thermally insulated cryogenic liquid container having a high thermally conductive member for intercepting inflowing heat disposed within the insulation material and thermally joined to a thermoelectric heat pump for rejecting the intercepted heat back to the ambient.

12 Claims, 4 Drawing Figures

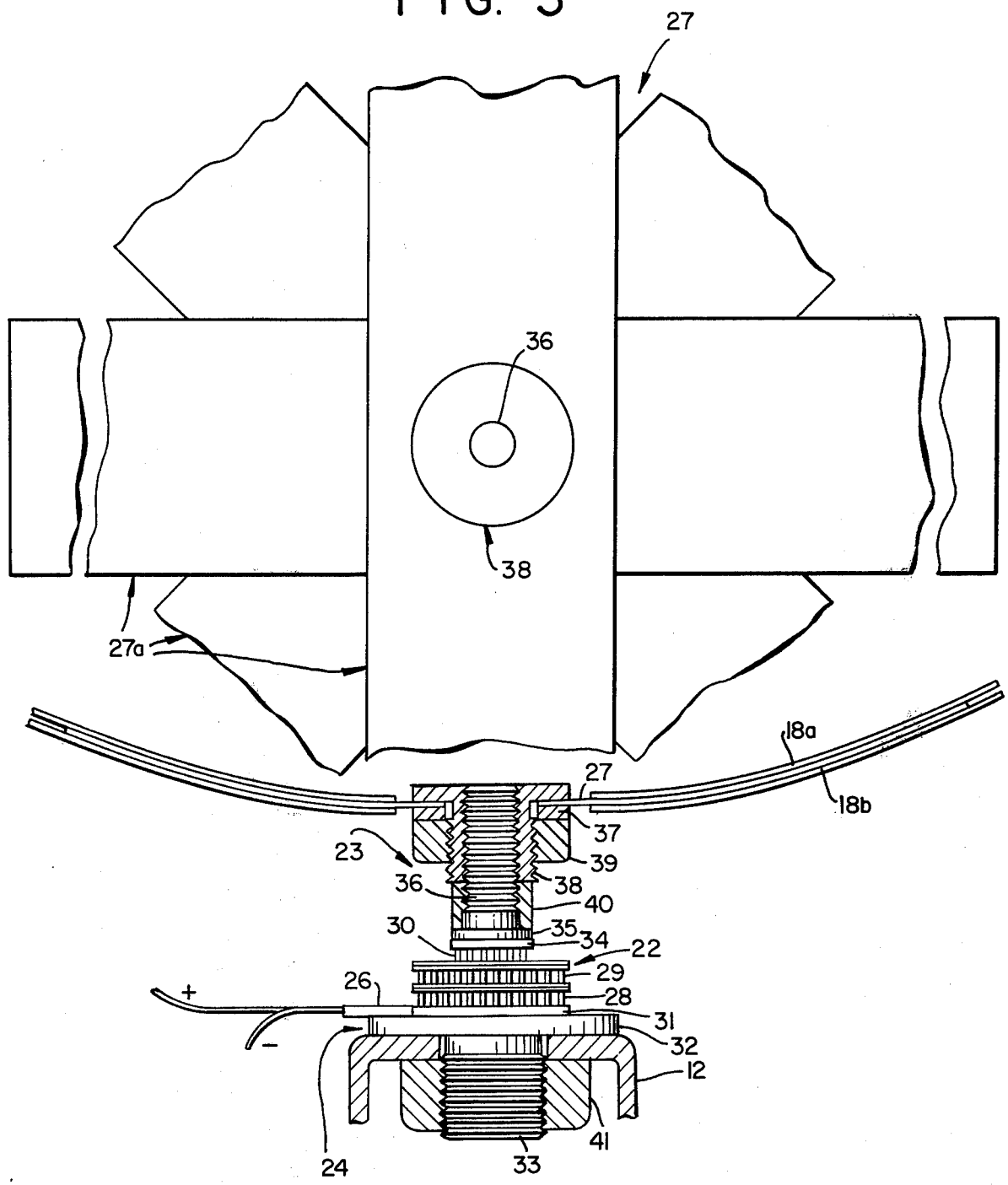

CRYOGENIC LIQUID CONTAINER

This invention relates to a double-walled vacuum insulated container for product storage at cryogenic temperatures. More particularly the invention relates to a double-walled vacuum insulated container having an actively refrigerated insulation system for product storage at cryogenic temperatures.

By an actively refrigerated insulation system is meant that the system intercepts a portion of the heat inflowing from the ambient and forces it against the temperature gradient back to the ambient by the application of an energy source.

BACKGROUND OF THE INVENTION

Double-walled vacuum insulated containers for the storage of cryogenic liquids, e.g. liquid nitrogen, oxygen, helium and hydrogen are well known in the art. Since such cryogenic liquids boil at very low temperatures, for example liquid oxygen at $-183°$ C., liquid nitrogen at $-195.8°$ C., liquid hydrogen at $-252.9°$ C., liquid helium at $-268.9°$ C., even small quantities of thermal energy flowing from ambient into the cryogen cause significant losses of cryogen through evaporation.

The prior art has developed many thermal insulations to be disposed in the vacuum space of such double-walled containers to decrease the heat flow from ambient into the cryogen. Containers which represent the most advanced state of the art include thermal insulation systems comprising three basic components:

a vacuum space formed by double-walled construction;

a multilayered insulation comprised of layers of low conductive materials alternating with sheets of thin, flexible radiation barriers disposed within the vacuum space; and heat-exchanger shields disposed within the multilayered insulation and connected to the necktube of the double-walled container to conduct part of the inflowing thermal energy through the necktube wall into the cold effluent gas which carries it away to the atmosphere. Such an insulation system is described, for example, in U.S. Pat. No. 3,133,422—Paivanas et.al.

The prior art has made many improvements in the three basic components of such thermal insulations and their optimization as a system. However, the improvements to these basic components and their optimization as a system are approaching the limit of efficiency beyond which further improvements result in negligible advantage or are not economically feasible.

Other prior art methods to increase thermal insulation effectiveness include placing a shield between the hot and cold walls of the double-walled container, which shield is cooled by a vaporizable liquid. Such a shield intercepts heat flowing from the warm to cold wall which heat is absorbed by the vaporizing liquid and is "rejected" as vapor back to the warm side of the system. However, such systems are structurally complex, require an auxiliary refrigerant fluid and a source for replenishing the refrigerant fluid. Thus such systems are expensive and the auxiliary equipment adds bulk to the system.

The need therefore exists for a container for the storage of cryogenic liquids having an improved thermal insulation system which is effective, structurally simple, inexpensive, and does not add undue bulk to the container.

A container for the storage of cryogenic liquids having an improved thermal insulation system would result in cost savings in reducing the loss of the cryogenic liquid due to evaporation. Since the loss of cryogenic liquid due to evaporation is decreased, the holding time for a given container—i.e. the time interval in which a user of cryogenic liquid would have to have a container refilled to replenish losses due to evaporation—would be increased. Thus the frequency of refilling the cryogen would be reduced.

OBJECT OF THE INVENTION

It is therefore an object of the present invention to provide a double-walled container for the storage of cryogenic liquids having an improved thermal insulation.

It is a further object of the present invention to provide a double-walled container for the storage of cryogenic liquids having an improved thermal insulation which improvement is inexpensive, structurally simple and does not add undue bulk to the container.

It is a further object of the present invention to provde a double-walled container for the storage of cryogenic liquids having an improved thermal insulation by incorporating into an existing insulation a structurally simple actively refrigerated insulation system.

More specifically, it is an object of the present invention to provide a double-walled container for the storage of cryogenic liquids having an improved thermal insulation by incorporating into an existing insulation a novel insulation wherein a portion of the heat flow from ambient to the cryogen is intercepted and rejected back to ambient by a thermoelectric heat pump.

Other objects will be apparent from the following description and claims in conjunction with the drawings.

SUMMARY OF THE INVENTION

The present invention may be generally characterized as a container for the storage of a cryogenic liquid, the container comprising:

(a) an inner vessel for holding cryogenic liquid;

(b) an outer shell surrounding the inner vessel arranged and constructed with respect to the inner vessel so as to form an evacuable space therebetween;

(c) insulation material disposed within and substantially filling the evacuable space;

(d) at least one high thermally conductive heat interceptor member disposed within and surrounded by the insulation material and oriented generally parallel to the inner vessel wall;

(e) at least one thermoelectric heat pump within the evacuable space being positioned between the heat interceptor member (d) and the outer shell (b) and having a hot end facing the outer shell (b) and a cold end facing the heat interceptor member (d);

(f) heat dissipation means for transferring heat from the hot end of (e) to the ambient surrounding the outer shell; (g) first high thermally conductive means within the evacuable space joining the hot end of (e) and the heat dissipation means (f); and (h) second high thermally conductive means within the evacuable space joining the cold end of (e) and the heat interceptor member (d); with (i) the thermoelectric heat pump (e), the first high thermally conductive means (g); the second high thermally conductive means (h) and the heat interceptor member (d) being constructed and arranged so that the heat interceptor member (d) assumes temperature lower than temperature assumed by the heat interceptor member (d) absent the construction and arrangement.

In the preferred embodiment of the present invention the outer shell (b) is constructed from a high thermally conductive metal and comprises the heat dissipation means (f).

BRIEF DESCRIPTION OF THE DRAWINGS

FIG. 2 is a side elevation view partly in section showing the detailed connection of the thermoelectric heat pump to the heat interceptor member and the outer shell of the container in the embodiment of the present invention illustrated in FIG. 1.

FIG. 3 is a plan view showing a portion of the heat collector member forming a part of the detailed connection of the thermoelectric heat pump to the heat interceptor member in accordance with the embodiment of the present invention illustrated in FIG. 1 and 2.

DESCRIPTION OF THE PREFERRED EMBODIMENT

Figure 1:
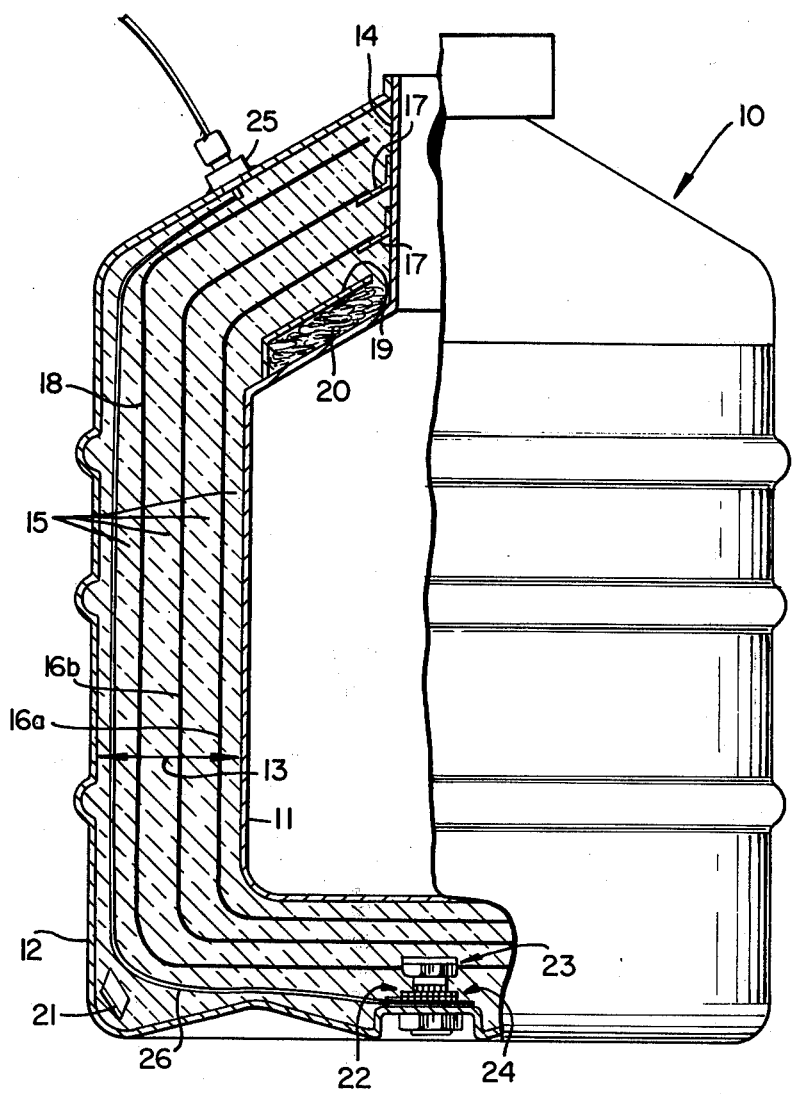
FIG. 1 is a view with parts cut away of a longitudinal cross-section through a portion of a cryogenic liquid container constructed in accordance with a particular embodiment of the present invention.

In order to afford a complete understanding of the present invention and an appreciation of its advantages, a description of the preferred embodiments is presented below.

One embodiment of the present invention takes the form of a double-walled container for the storage of cryogenic liquids comprising an inner storage vessel and an outer shell surrounding the inner vessel being arranged and constructed with respect to the inner vessel so as to form an evacuable space therebetween. A conduit is provided between the inner vessel and the outer shell to provide for ingress and egress from the inner vessel—e.g. for the filling of the vessel with cryogenic liquid and for the escape of cold effluent gas resulting from the evaporation of the cryogenic liquid caused by the inflow of heat from the ambient into the cryogen. A thermal insulation material is disposed in and substantially fills the evacuable space between the inner wall and the outer wall. The thermal insulation material may be in general any thermal insulation known to the art for use with cryogenic storage containers. Such thermal insulation materials typically comprise low thermally conductive materials and high radiant heat reflective materials.

Examples of suitable thermal insulation materials would include: Composite multilayered insulations comprising radiation barriers materials interleaved with low heat conductive spacer materials. Such insulations are described, for example, in U.S. Pat. No. 3,009,600—Matsch; U.S. Pat. No. 3,009,601—Matsch; U.S. Pat. No. 3,265,236—Gibbon et. al.; and U.S. Pat. No. 4,055,268—Barthel. An example of a suitable multi-layered insulation having one component comprising a metal coated organic plastic film is described in U.S. Pat. No. 3,018,016—Hnilicka.

In accordance with the present invention, a high thermally conductive member such as an aluminum or copper sheet having the general shape of the inner storage vessel is disposed within and is surrounded by the thermal insulation material.

Thus the member is contiguously associated with and in heat transfer relationship to the insulation material on both sides, thereby becoming an integrated part of the insulation system. This high thermally conductive metal member is oriented generally parallel to the inner storage vessel wall and may substantially surround the inner storage vessel.

In accordance with the present invention, as hereinafter more fully described, the high thermally conductive member is thermally connected to a thermoelectric heat pump positioned between the member and the outer shell of the container. The high thermally conductive member will function to intercept heat flowing from the ambient adjacent to the outer shell of the container across the thermal insulation-filled evacuable space toward the inner vessel holding the cryogen. The intercepted heat is conducted along the high thermally conductive member to the thermal connection with the cold end of the thermoelectric heat pump. The intercepted heat is then forced by the thermoelectric heat pump into a heat sink, hereinafter more fully described, which is thermally connected to the hot end of the thermoelectric heat pump, wherefrom the heat is dissipated into the ambient. Preferably, the hot end of the thermoelectric heat pump is thermally joined to the outer shell which is constructed of a high thermally conductive material wherein the outer shell dissipates the heat to the ambient environment surrounding the outer shell.

Thus the total heat flowing from the ambient into the vessel holding the cryogenic liquid will be decreased by that amount of heat which the high thermally conductive member intercepts and conducts to the thermoelectric heat pump which in turn rejects this heat back to the ambient.

The high thermally conductive member will be referred to herein as a heat interceptor member.

Since a portion of the heat flowing from the ambient into the vessel is intercepted and rejected back against the temperature gradient to the ambient by the cooperation of the heat interceptor member, the thermoelectric heat pump, and preferably the outer shell, this system may be referred to as an actively refrigerated insulation system. The double-walled cryogenic container of the present invention thus adds a novel active or "dynamic" insulation to prior art double-walled cryogenic containers.

It will be apparent that a plurality of heat interceptor members may be positioned in parallel spaced relationship disposed within and surrounded by the insulation material disposed in the evacuable space between the inner vessel and outer shell of the container with each heat interceptor member being thermally connected to a thermoelectric heat pump. Likewise, a plurality of thermoelectric heat pumps may be thermally connected to a single heat interceptor member.

The thermal conductivity of the material for the heat interceptor member is suitably at least about 2 watt·cm$^{-1}$·K$^{-1}$ at $-50°$ C. to about 4.29 watt·cm$^{-1}$·K$^{-1}$ at $-50°$ C. Materials having a lower thermal conductivity could be used but would require providing a heat interceptor member with a greater cross-sectional area. The preferred metals for the construction of the heat interceptor member are copper or aluminum.

Thermal conductivities, expressed in watt·cm$^{-1}$·K$^{-1}$ of the four most conductive metals at about $-50°$ C. (a representative temperature for the interceptor member) are in decreasing order as follows: silver 4.29; copper 4.09; gold 3.23; and aluminum 2.36.

In determining whether to select aluminum or cooper as a material for the construction of a heat interceptor member for a given container in accordance with the present invention, one skilled in the art would consider the following:

The apparent thermal disadvantage of aluminum compared to copper is compensated by the weight advantage of aluminum versus copper. In other words, to conduct a given amount of heat energy an aluminum conductor needs to have a cross-sectional area about 73% greater than that of a copper conductor. But the weight of the, albeit bulkier, aluminum conductor will be only half as much as that of the copper conductor.

Brasses, bronzes, magnesium, nickel, ferrous alloys, and other materials are considerably less attractive than aluminum or copper for reasons of decreasing conductivities, manufacturing costs, and ease of handling.

The thickness of the heat interceptor member is suitably about 0.02 to 0.3 centimeters. The heat interceptor member may be either a single thickness of metal or alternately multiple thicknesses of thin metal foil applied, for example, by spiral or orbital wrapping about the insulation at appropriate locations. Thus the heat interceptor member may be sufficiently thick to be substantially rigid so as to support its own weight, for example 0.3 cm of aluminum or copper sheeting, or a thin non-self-supporting foil supported by the insulation material. In either instance, the heat interceptor member is contiguously associated with and in thermal association to the insulation on both sides. This may be accomplished by installing a first portion of the thermal insulation material to the inner vessel in a conventional manner, e.g., using an orbital wrapping method or orbital-spiral wrapping method as described in U.S. Pat. No. 3,708,131, followed by installation of the heat interceptor member contiguously with the installed insulation; followed by the installation of the remaining portion of the thermal insulation material in a conventional manner contiguously with the heat interceptor member. Since a single thickness heat interceptor must be worked to conform to the surface of the initially installed insulation and most conveniently installed in sections which are subsequently soldered so as to be thermally joined, one skilled in the art may find it advantageous to install the heat interceptor member as multiple layers of wrapped foil using, for example, the aforementioned orbital wrapping method.

The heat interceptor member of the present invention is located at a position within the insulation disposed within the evacuable space of the double-walled container holding the cryogen so that upon thermal connection to the hereinafter described thermoelectric heat pump, the heat interceptor member assumes a temperature lower than that temperature assumed absent the connection. Thus for a particular container, it will be readily apparent to one skilled in the art that the location of the heat interceptor member will be determined by the effectiveness of the insulation system in which the heat interceptor will be disposed and the capacity of the hereinafter described thermoelectric heat pump to reject heat intercepted by the heat interceptor member back to the ambient.

The heat interceptor member is suitably positioned so as to be normal to the flow of heat from the outer shell to the inner vessel, that is, essentially parallel with the insulation layers. The location of the heat interceptor member within the insulation system may be determined by the following: The lowest temperature of the heat interceptor member which can be maintained by a selected thermoelectric heat pump in steady state and the capacity of the selected thermoelectric heat pump to handle the thermal load at this particular temperature of the heat interceptor member is ascertained. Having conventionally determined the temperature profile across a selected insulation system (either analytically or experimentally) with no active heat interception, the heat interceptor member is suitably located inside such an insulation system at a level where the temperature of the heat interceptor member is below the temperature of the adjacent insulation layer, e.g. about 3° to 20° C., when the heat interceptor member is in thermal connection with the activated heat pump which at the imposed heat load maintains in steady state the lower temperature of the member, so that a heat flow from the adjacent insulation layer into the heat interceptor member is maintained.

It is important to clearly differentiate the heat interceptor member of the present invention from radiation shields employed in prior art thermal insulations and heat-exchanger shields disposed within the insulation and connected to the necktube of the doublewalled container such as described for example in U.S. Pat. No. 3,133,422—Paivanas et al.

With respect to radiation shields, the heat interceptor member of the present invention is formed of a highly conductive material—e.g., a metal having a high thermal conductivity as hereinbefore described. This permits conduction of the intercepted heat to the thermoelectric heat pump for rejection to the ambient. In contrast, prior art radiation shields need not be highly conductive and if desired may be composed of metal coated, for example, on a plastic film, most plastics having low thermal conductivity values. Furthermore, whereas the metal of a radiation shield desirably is highly reflective, (i.e. has a low emissivity approaching as closely as practical to zero wherein a black body is defined as having an emissivity of 1.0), the heat interceptor member of the present invention is essentially a heat conductor, its emissivity being irrelevant to its function.

Heat-exchanger shields of the prior art, disposed within the insulation of a double-walled container and thermally connected to the necktube of the doublewalled container to conduct part of the inflowing thermal energy into the cold effluent gas egressing through the necktube, which carries the heat away to atmosphere, as described, for example, in U.S. Pat. No. 3,133,422—Paivanas et.al., also need to be good heat conductors.

These prior art shields take advantage of the sensible refrigeration available in the gas evaporated from the liquid cryogen by the thermal energy flowing into the cryogen. Thus such shields are dependent on the evaporated liquid cryogen. The sensible refrigeration by the effluent gas removes a portion of the heat energy, inflowing through a number of paths, by transferring it through solid conduction across the necktube wall into the effluent gas. It is apparent that the effectiveness of such shields is limited by the enthalpy of the effluent gas, that is, its heat capacity between the boiling temperature of the cryogen and ambient temperature. As the system is optimized, the recovery mechanism reaches its limit of efficiency and no additional thermal energy can be removed by such devices. For this reason insulation systems designed for double walled vessels to hold liquid nitrogen, for example, will usually employ at the most 3 heat exchanger shields, because the heat capacity of gaseous nitrogen between, for example $-195°$ C. ($-320°$ F.) and $+21°$ C. ($+70°$ F.) is only 277 joules per gram.

Insulation systems designed for double-walled containers to hold liquid helium, however, have been built with up to 10 heat exchanger shields because of the enormous heat sink available in the effluent gaseous helium which amounts to 1520 joules per gram between, for example, $-269°$ C. ($-452°$ F.) and $+21°$ C. ($+70°$ F.).

In contrast, the actively refrigerated insulation system, incorporated into the double-walled container of the present invention, functions independently of the effluent gas. The inflowing heat removed by the heat interceptor member flows into the hereinafter described thermoelectric heat pump which rejects the heat back to preferably the outer shell of the container for dissipation to the ambient.

The use of thermoelectric heat pumps or thermoelectric modules for refrigeration is well known in the art. Thermoelectric heat pumps or modules are semiconductor devices which operate on the principle of the well known Peltier Effect—i.e., when an electric current is passed through a junction of two dissimilar materials a heating or cooling effect at the junction takes place depending on the direction of the current. Basically, a thermoelectric heat pump is a modular semiconductor device wherein when a direct current is applied to the semiconductor, heat is "pumped" from a cold end to a hot end. Such thermoelectric heat pump modules are well known to the art and the operation of such modules therefore will not be described in detail.

Modular semiconductor thermoelectric heat pumps are manufactured, for example, by Melcor Materials Electronic Products Corporation, Trenton, N.J.; Borg-Warner Thermoelectrics, Des Plaines, Ill.; and Cambridge Thermionic Corporation, Cambridge, Mass.

General information regarding thermoelectric heat pumps may be found for example in "Thermoelectric Devices for Space and Remote Terrestrial Sites", by Glen Whiting and John McKiernan *Mechanical Engineering*, Vol. 92, No. 8 (August 1970); *The CAMBION Thermoelectric Handbook*, Second Edition, 1972, published by Cambridge Thermionic Corporation; and Van Nostrand's *Scientific Encyclopedia, Fifth Edition*, 1976, under the entry of "Thermoelectric Cooling," pages 2188 and 2189.

Thermoelectric heat pumps are characterized as being small and having no moving part.

In accordance with the present invention, a conventional thermoelectric heat pump is positioned in the evacuable space between the inner vessel and outer shell of the double-walled container with the cold end facing and thermally connected to the heat interceptor member and the hot end facing and preferably thermally connected to the outer shell of the container. Such a connection must be a high thermally conductive connection but may be made in any convenient manner known to the art such as by soldering, adhesive joining, or bolting. To minimize losses by radiation, the thermoelectric heat pump is suitably surrounded by the insulation material disposed in the evacuable space so as to match in a general way the temperature profile across the last portion of the insulation positioned between the heat interceptor member and the outer shell with the temperature profile across the thermoelectric module from the cold end to the hot end.

A direct current from a conventional source is applied in a conventional manner across the thermoelectric device, and heat is "pumped" by the thermoelectric heat pump from the heat interceptor member and rejected preferably to the outer shell of the container for dissipation to the ambient preferably by the outer shell.

It is therefore important that the outer shell of the double-walled container in the preferred embodiment of the present invention be constructed of a high thermally conductive material such as aluminum or copper so that the rejected heat can be efficiently conducted along the surface of the outer shell to aid in the dissipation of heat to the ambient by radiation as well as by gaseous conduction and convection.

The thermal conductivity of the material from which the outer shell is constructed in the preferred embodiment of the present invention is, therefore, suitably about 2 watt·cm$^{-1}$·K$^{-1}$ to 4.29 watt·cm$^{-1}$·K$^{-1}$ at the ambient temperature surrounding the outer shell. Although not necessary for the practice of the preferred embodiment of the present invention, heat dissipation from the outer shell may be facilitated, for example, by the use of fins connected to the outer shell to increase the heat dissipation area, forced convection through the use of air blowers, or liquid cooling (e.g. water). In many instances, however, such additional cooling means would be undesirable as they detract from the structural simplicity and compactness of the double-walled container of the present invention.

If the outer shell is a poor thermal conductor (i.e., significantly less than 2 watt·cm$^{-1}$·K$^{-1}$), it would be very advantageous to provide another adequate heat sink, such as those hereinbefore described, in thermal connection with the hot end of the thermoelectric heat pump for dissipating to the ambient heat "pumped" by the thermoelectric heat pump from the heat interceptor member.

Since heat inflowing from the ambient across the insulation of the double-walled container toward the inner vessel holding the liquid cryogen is intercepted by the heat interceptor member and rejected preferably to the outer shell of the container by the thermoelectric heat pump for dissipation to the ambient, the outer shell of the container will assume a temperature slightly higher than that of the ambient. Thus it is a paradox of the preferred embodiment of the present invention that the outer shell of the double-walled container assumes a temperature slightly higher than ambient although the amount of heat inflowing from the outer shell into the inner vessel holding the cryogen is decreased.

Figure 4:
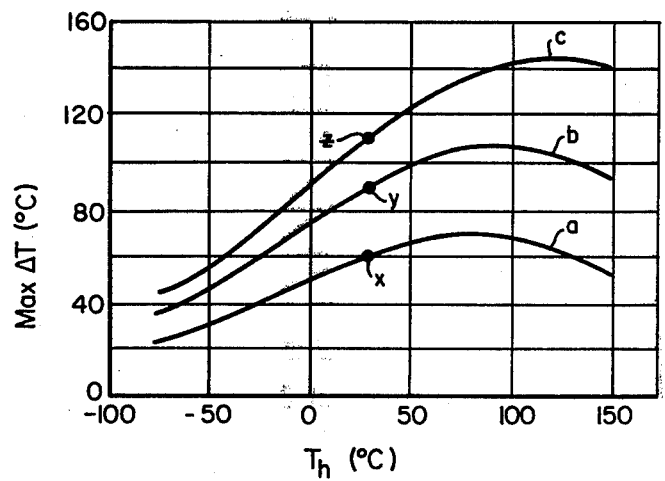
FIG. 4 is a graph showing ideal maximum temperature differentials achieved by one, two, and three stage modular thermoelectric heat pumps used in the practice of embodiments of the present invention similar to that illustrated in FIGS. 1 to 3.

Conventional thermoelectric heat pumps are available in single stage or cascaded modules with two or more stages. Cascaded modules achieve lower temperatures at the cold face but reduced heat pumping capacities result. FIG. 4 illustrates maximum ideal temperature differentials that can be achieved by typical single, two and three stage module thermoelectric heat pumps as a function of the temperature of the body attached to the hot face of the pump. In FIG. 4, the maximum temperature differential ΔT, at optimum current, is plotted as a function of $T_h$ for single stage (curve a), two stage (curve b), and three stage (curve c) modules. In FIG. 4, $T_h$ equals temperature (°C.) of the hot end of a thermoelectric module; $T_c$ equals temperature (°C.) of the cold end of a thermoelectric module; and $\Delta T = T_h - T_c$.

Thermoelectric heat pumps with more than three stage cascaded modules are seldom used because of their low efficiency. This is due to the fact that thermal losses increase non-linearly with increasing number of stages.

Referring to points x, y, and z in FIG. 4, it is apparent that the use of commercially practical thermoelectric heat pumps as refrigeration agents is limited to a temperature range of about −30° C. to about −80° C. assuming the hot face is thermally connected to an adequate heat sink at about 27° C. Such temperatures represent an idealized situation wherein there are no thermal loads.

Thus, as hereinbefore described, the heat interceptor member is located at a position within the insulation disposed within the evacuable space of the double-walled container so that upon thermal connection to the thermoelectric heat pump the heat interceptor member assumes a temperature lower than the temperature of the insulation layer adjacent to the interceptor member.

Since commercially practical 3-stage thermoelectric heat pumps can only achieve a theoretical low temperature of about −70° C. to −80° C. when the hot face is connected to a body at about 27° C., it is a surprising and an unexpected result that such thermoelectric heat pumps incorporated in the double-walled container of the present invention can effectively reduce the evaporation of a liquid cryogen which boils at a temperature of −195.8° C. However, as demonstrated by the hereinafter described test, this is the result achieved by the container of the present invention.

With reference to the drawings and FIG. 1, a double-walled container 10 for a cryogenic liquid, e.g. liquid nitrogen, was constructed to illustrate a particular embodiment of the present invention.

The double-walled container 10 comprises an inner vessel 11 for holding a cryogenic liquid surrounded by an outer shell 12 constructed in this instance of aluminum with evacuable space 13 therebetween. Inner vessel 11 is supported by necktube 14 which also provides for ingress and egress from the inner vessel as hereinbefore discussed. Disposed with and substantially filling the evacuable space 13 is a composite multilayer thermal insulation 15 of the type disclosed in U.S. Pat. No. 3,265,236—Gibbon et.al. the disclosure of which is incorporated herein by reference. Such multilayered insulation comprises alternate layers of 0.0076 mm (0.0003 inches) thick aluminum foil (a radiant heat barrier material) and 0.05 mm (0.002 inches) thick organic microfiber web (a low conductive material). Two heat conductive shields 16a and 16b of the type disclosed in U.S. Pat. No. 3,133,422—Paivanas et.al. and U.S. Pat. No. 3,341,052—Barthel, the disclosures of both of which are incorporated herein by reference, extend concentrically around inner vessel 11 at intervals across evacuable space 13 and are separated by layers of composite insulation 15. In the presently described container, each shield comprised the approximate equivalent of 2 layers of 0.0076 mm. thick aluminum foil. The heat conductive shields 16a and 16b were thermally connected to necktube 14 by frusto-conical sections 17 in the manner disclosed in U.S. Pat. No. 3,341,052—Barthel.

Thus the heat conductive shields 16a and 16b are a thin, non-self supporting flexible, highly conductive metal and are coextensive with and supported on both sides by the multilayered insulation 15. The heat conductive shields are thermally joined by a low thermal resistance connection to the necktube 14 in order to take advantage of the sensible refrigeration available in the effluent gas egressing through the necktube, or fluid conduit, 14 as hereinabove described. That is, the effluent gas is a heat absorbing fluid egressing from the inner vessel. These shields 16a and 16b are secured to the necktube by the low thermal resistance connection 17 at a region where the temperature is lower than the temperature assumed by the shields 16a and 16b absent the securing so as to transfer heat from the shields to the necktube 14.

A heat interceptor member 18 is located between outermost heat conductive shield 16b and outer shell 12. Heat interceptor member 18 extends concentrically around inner vessel 11 and is separated from heat conductive shield 16b and outer shell 12 by layers of composite insulation 15. Heat interceptor member 18 neither contacts nor is thermally connected to necktube 14. In the container of the herein described embodiment of the present invention, heat interceptor member 18 comprised the approximate equivalent of 4 layers of 0.0076 mm. thick aluminum foil.

The container further comprises an adsorbent retainer 19 holding molecular sieve 5A adsorbent 20 manufactured by Union Carbide Corporation New York, N.Y. and a getter 21 of PdO for maintaining a vacuum drawn in the evacuable space 13. The container also includes a conventional sealable tube penetrating outer shell 12 (not shown) for access for pumping a vacuum in evacuable space 13.

A thermoelectric heat pump 22 as shown in FIG. 1 and FIG. 2 is located between the heat interceptor member 18 and outer shell 12 at the approximate center of the bottom portion of the container 10 with cold end 34 (FIG. 2) facing heat interceptor member 18 and hot end 31 (FIG. 2) facing outer shell 12. The cold end 34 of thermoelectric heat pump 22 is joined by a high thermally conductive connection 23 to heat interceptor member 18 and the hot end is joined by a high thermally conductive connection 24 to outer shell 12. The thermoelectric heat pump and the hot and cold connections will be hereinafter more fully described.

The container further comprises a conventional vacuum tight electrical feedthrough 25 penetrating outer shell 12 for the passage of electrical line 26 to energize the thermoelectric heat pump 22 with a direct current electrical power source (not shown). The outer shell 12 of the container 10 may be assigned the function of the negative lead of the electrical supply line, thus leaving only the positive lead in line 26.

For the container of the presently described embodiment, the insulation construction was assembled in the following manner: 8 layers of the hereinbefore described composite insulation 15 were wrapped about inner vessel 11 using a conventional orbital wrapping method. The first heat conductive shield 16a was then wrapped about the composite insulation also by the orbital wrapping method, the aluminum foil being in sheets 7.6 cm wide and 0.0076 mm thick and thermally connected to necktube 14 as hereinbefore described. This is followed by 12 layers of the composite insulation 15, followed by second heat conductive shield 16b, followed by 16 layers of composite insulation 15 all applied in a like manner.

Heat interceptor member 18 is similarly wrapped about the composite insulation 15 using aluminum foil sheets 7.6 cm wide and 0.0076 mm thick as in the heat conductive shields 16a and 16b. First 2 layers of the aluminum foil 18a (FIG. 2) are applied by orbital wrapping. A heat collector member 27 (FIG. 2 and FIG. 3) of high thermally conductive connector assembly 23, hereinafter described in conjunction with FIGS. 2 and 3 is contiguously joined in heat transfer relationship with the installed layers 18a of the heat interceptor member followed by further wrapping of 2 layers of the aluminum foil 18b likewise contiguously joined in heat transfer relationship with heat collector member 27. Thus the heat interceptor member 19 is installed as multiple layers of aluminum foil with a heat collector member 27 hereinafter more fully described disposed among the layers.

The heat interceptor member is similarly wrapped with 14 layers of composite insulation 15.

Thus the assembly method described provides that the heat conductive shields 16a and 16b and the heat interceptor member 18 are surrounded by and contiguous with and in heat transfer relationship to the composite insulation 15.

The hereinbefore described conventional orbital wrapping of the insulation conveniently provides a void at the bottom center of the insulation construction for the insertion of thermoelectric heat pump 22 for connection to heat interceptor member 18 as hereinafter described. Outer shell 12 is then installed with the hot end of thermoelectric heat pump 22 being thermally connected to the outer shell as hereinafter described.

In the container of the herein described particular embodiment of the present invention, the thermoelectric heat pump has been located at the bottom center portion of the container. This location was chosen for ease of manufacture and assembly of the container. As hereinbefore described, the orbital wrapping of the insulation provides a void for the insertion of the thermoelectric heat pump in the insulation construction. Furthermore, such a location facilitates ease of alignment for connection of the hot end of the thermoelectric heat pump to the outer shell. It will be apparent to one skilled in the art, that the outer shell would be conveniently installed in two portions—an upper portion which conforms to the shape of the insulation wrapped vessel which is installed over the insulation wrapped vessel and a lower portion, having a plate-like configuration at the bottom, which is then joined in heat transfer relationship to the upper portion, for example by welding, after alignment with and connection to the hot end of the thermoelectric heat pump, forming the completed outer shell.

However, the positioning of the thermoelectric heat pump at the "equator" of the container would increase the efficiency of the heat interceptor member as the path of thermal conduction from the farthest points of the heat interceptor member to the cold end connection of the thermoelectric heat pump would be reduced and the exposure to ambient increased. However, in this particularly described embodiment one skilled in the art may find such an assembly less desirable from a manufacturing viewpoint.

With reference to FIG. 2, the thermoelectric heat pump 22 is shown in conjunction with a portion of the construction of container 10. The thermoelectric heat pump used in the container of the presently described embodiment comprises a bottom stage 28 being a CP 1.4-71-06BB module, a second stage 29 being a CP 1.4-35-06BB module, and a top stage 30 being a CP 1.4-17-06BB module manufactured by Melcor Materials Electronic Products Corporation, Trenton, N.J.

The hot end 31 of bottom stage 28 is thermally joined to hot plate 32 by soldering wherein hot plate 32 is constructed of copper. Bolt-like threaded member 33 being part of hot plate 32 extends perpendicularly from the bottom of hot plate 32. Bolt-like member 33 passes through an opening provided in outer shell 12 wherein hot plate 32 is secured against outer shell 12 by nut 41 forming thus a high thermally conductive connection joining the hot end 31 of the thermoelectric heat pump 22 and the outer shell 12 wherefrom the heat is dissipated into the ambient. An appropriate vacuum seal (not shown) is located between hot plate 32 and outer shell 12. Other means of a hermetic seal-off are known and readily available to those skilled in the art.

To enhance freedom of movement between hot plate 32 and outer shell 12 an intermediate flexible bellowed heat conductive membrane may be structurally interposed between hot plate 32 and outer shell 12. A heat pipe may be used for thermal connection joining hot end 31 and heat sink, e.g. outer shell 12. It is understood that the hot end thermal connection may be adaptable to a variety of forms apparent to those skilled in the art.

The cold end 34 of top stage 30 is thermally joined to cold plate 35 by soldering wherein cold plate 35 is constructed of copper. Any other metal, preferably of high thermal conductivity, can be used. Instead of solder a heat conductive adhesive, for example, can be used. Bolt-like threaded member 36 being part of cold plate 35 extends perpendicularly from the face of cold plate 35 for assembly into hub 38.

With reference to FIGS. 1, 2 and 3, after 2 layers of aluminum foil 18a of heat interceptor member 18 are orbitally wrapped onto the insulation construction of container 10, a heat collector member 27 (greatly exaggerated in thickness in FIG. 2), formed from 4 strips of flexible soft annealed copper sheet about 0.2 mm (0.008 inches) thick and 4.5 cm (1.75 inches) wide, is placed over the aluminum layers 18a and secured with pressure sensitive aluminum tape, for example, (not shown) to the aluminum layers 18a. To facilitate handling and assembly, the individual copper strips 27a of the heat collector member 27 are conveniently preassembled by means of a hub 38, passing through a center hole in each of copper strips 27a, with washer 37 and nut 39 securing copper strips 27a to hub 38 forming thus one high thermally conductive structural unit, the heat collector member 27. This heat collector member 27 is attached to the bottom hemisphere of the container as hereinbefore described so that hub 38 is in axial alignment with the container. The remaining layers of aluminum foil 18b of heat interceptor member 18 are then orbitally wrapped onto the construction thus forming the completed heat interceptor member 18 with heat collector member 27 disposed in and in contiguous heat transfer relationship with the heat interceptor member 18. It is apparent that the larger the surface area of thermal contact of heat collector member 27 with heat interceptor member 18 the greater will be the efficiency of the heat pumped from the heat interceptor. In the container of this particular embodiment of the present invention, the length of copper strips 27a of heat collector member 27 was sufficient for the strips to extend to the approximate "equator" of container 10.

Bolt-like threaded member 36 and a spacer bushing 40 are jointed to hub 38 completing the cold end high thermally conductive connection of the heat pump.

It is understood that the heat interceptor member 18 may be structured from two hemispherical high heat conducting calottes, joined at the "equator" to form a unistructural thermal enclosure.

The thermal connection between the heat pump 22 and the heat interceptor member 18 may take a variety of forms apparent to those skilled in the art. In this particular embodiment of the present invention, hub 38, nut 39, washer 37, and spacer bushing 40 were all constructed of copper so as to form a high thermally conductive connection. However, both materials and parts may be varied. To enhance flexibility, for example, multistranded high heat conductive cables, or a flexible heat pipe can be used individually or in conjunction with each other, instead of the construction herein described.

it is also apparent to those skilled in the art that the heat collector member 27 may be structured as a calotte. Likewise, heat collector member 27 may be constructed from any high thermally conductive material.

In constructing containers in accordance with the present invention in commercial scale quantities, one skilled in the art may find it advantageous from a manufacturing viewpoint to fabricate the heat collector member 27 as a hemispherical high thermally conductive calotte, instead of miltiple copper strips 27a, as discussed in the foregoing. Likewise, in commercial applications, one skilled in the art may find it advantageous to employ the aforementioned multistranded high heat conductive cables in the cold end connection in order to provide a flexible connection between the heat interceptor member and the thermoelectric heat pump. Such a flexible connection would assist in preventing damage to the thermoelectric heat pump from vibrations induced by container handling.

It is also understood that the container described in the foregoing is a description of a particular embodiment of the present invention and is not intended to limit the present invention as defined in the claims.

EXAMPLES

EXAMPLE I

A container was constructed in accordance with the foregoing description having a 29 liter capacity. Such a container is essentially a conventional XR-16 cryogenic liquid container manufactured by Union Carbide Corporation, New York, NY, except that instead of having three heat conductive shields, thermally joined to the necktube, the outermost shield is replaced with a heat interceptor member (not connected to the neck tube) in conjunction with a thermoelectric heat pump in accordance with the foregoing description. The direct-current for the thermoelectric heat pump was provided by a conventional plug-in converter-rectifier. The container was filled with 29 liters of liquid nitrogen (boiling point $-195,8°$ C.) and the necktube was plugged and capped in a conventional manner. Conditions were as follows:

Evacuable vacuum space: Approximately 31 liter.
Evacuable space vacuum: about $6 \times 10^{-5}$ torr.
Electric power to thermoelectric heat pump: 2.87 amps D.C. at 8.5 volts.

Heat Interceptor member temperature at contact with the cold end of the thermoelectric heat pump: $-55°$ C.

Heat Interceptor member temperature at approximately the "equator" of the container: $-48°$ C.

Outer shell temperature at contact with the hot end of the theremoelectric heat pump: $39°$ C. (center bottom of container).

Outer shell temperature half way between the center and periphery of the bottom portion of the outer shell: $34°$ C.

Outer shell side wall temperature $28°$ C.

Ambient temperature surrounding the container $25°$ C.

The test container was positioned on a scale and over a 9 day period the loss of liquid nitrogen was 748 grams.

Therefore the Normal Evaporation Rate (NER) is approximately 83 grams/day.

Since the weight of liquid nitrogen is 808.3 grams/liter, the holding time of the test container is:

$$\frac{29 \text{ liter} \times 808.3 \text{ grams/liter}}{83 \text{ grams/day}} = 282 \text{ days}$$

In other words, if this container was filled to its full capacity and then left undisturbed under normal atmospheric pressure and normal temperature, the last drop of liquid nitrogen would have evaporated after 282 days.

The mean normal evaporation rate (NER) of a conventional 29 liter capacity XR-16 cryogenic container holding liquid nitrogen with a vacuum in the evacuable space of $2 \times 10^{-5}$ to $5 \times 10^{-5}$ torr is about 111 grams/day.

The holding time of the conventional container is therefore:

$$\frac{29 \text{ liter} \times 808.3 \text{ grams/liter}}{111 \text{ grams/day}} = 211 \text{ days}$$

Thus the improvement of the cryogenic liquid container constructed in accordance with the present invention in comparison to a similar state of the art container is:

$$100 \, (282-211) \text{ days}/211 \text{ days} = 34\%$$

Thus this test container constructed in accordance with a particular embodiment of the present invention demonstrates the improved capability of a cryogenic liquid container constructed in accordance with the present invention to reduce evaporation losses and increase holding times for cryogenic liquids over state of the art containers.

The relative reduction of the heat flow through the insulation of the container of a particular embodiment of the present invention will be quantified and compared to insulation systems of the present state of the art containers.

It is well known to those skilled in the art that the 4 heat paths into the cryogen, stored in a container, are the solid conduction through the necktube and the neckplug, radiation through the annular gap between necktube and neckplug, and a complex transfer mechanism by radiation and solid conduction through the insulation system.

This relationship can be expressed in a heat transfer equation, of this form:

$$Q_t = Q_n + Q_p + Q_r + Q_i \qquad (1)$$

where $Q_t$ = total heat transfer into the cryogenic heat sink, expressed in any convenient units.

$Q_n$ = heat transfer through the necktube by solid conduction.

$Q_p$ = heat transfer through the neckplug by solid conduction.

$Q_r$ = heat transfer by radiation through the annular gap between the necktube and the neckplug.

$Q_i$ = heat transfer through the insulation system by radiation and solid conduction.

From the five terms of the equation, $Q_t$ can be measured directly in terms of the weight of the cryogen evaporated in a given time span; $Q_n$ and $Q_p$ can be compared because heat conduction properties of the respective solid materials are fairly well known and the physical dimensions of the parts can be determined within reasonable tolerances; radiation transfer can be computed by the well known radiative heat transfer equation:

$$Q_r = E\sigma A (t_1^4 - t_2^4) \qquad (2)$$

Where:
- E = mean emissivity.
- $\sigma$ = Stefan - Boltzmann Constant.
- A = area of the radiation window (annular gap).
- $t_1$ = absolute temperature of the heat-emitting surface.
- $t_2$ = absolute temperature of the heat-absorbing surface.

Since the sum of the heat transfers through the necktube ($Q_n$), the neckplug ($Q_p$), and by radiation through the annular gap ($Q_r$) is the same in the XR-16 containers, built to the present state of the art specifications, as well as in the test container constructed in accordance with a particular embodiment of the present invention, the heat flow equations can be rewritten for both types of containers as:

$$Q_t' = q + Q_i' \qquad (3)$$

and $$Q_t'' = q + Q_i'' \qquad (4)$$

where:

$q = Q_n + Q_p + Q_r$ is the sum of the heat transfer through the necktube, the neckplug and the annular radiation gap.

$Q_t'$ = total heat transfer into the cryogenic heat sink of the test container of a particular embodiment of the present invention.

$Q_i'$ = heat transfer through the insulation system of the container of a particular embodiment of the present invention.

$Q_t''$ = total heat transfer into the cryogenic heat sink for a container of the present state of the art.

$Q_i''$ = heat transfer through the insulation system of a container of the present state of the art.

Rearranging both equations (3) and (4) and transferring the unknown terms to the left-hand side, they can be rewritten.

$$Q_i' = Q_t' - q \qquad (5)$$

$$Q_i'' = Q_t'' - q \qquad (6)$$

The ratio of the heat transfer of the insulation system of the container of a particular embodiment of the present invention to the heat transfer of the insulation of a present state of the art container can now be expressed dividing equation (5) by equation (6)

$$Q_i'/Q_i'' = Q_t' - q / Q_t'' - q \qquad (7)$$

The total heat inflow, $Q_t'$, into the cryogenic heat sink of the container of the particular embodiment of the present invention can be readily derived from the normal evaporation rate, which was measured to be 83 grams per day of liquid nitrogen (0.183 lb/day) as hereinbefore described in Example I.

The heat of vaporization of liquid nitrogen at one atmosphere is 47.6 cal/gram. The change in enthalpy of the gas at 1 atmosphere isobar from $-195.8°$ C. (temperature of phase change from liquid to gas) to about 12.8° C. (temperature of the gas, measured in the annular gap between the necktube and the neckplug near the exit to ambient) is 52.3 cal/gram. Therefore:

$$Q_t' = 83 \text{ gram/day} \times (47.6 + 52.3) = 8291.7 \text{ cal/day}$$

The mean normal evaporation rate of the similar state of the art container is 111 gram per day of liquid nitrogen (0.244 lb/day) as hereinbefore described. Therefore:

$$Q_t'' = 111 \text{ gram/day} \times (47.6 + 52.3) \text{ cal/gram}$$
$$= 11088.9 \text{ cal/day}$$

The combined heat transfer by solid conduction for the necktube and the neckplug is conventionally calculated to be $$\begin{aligned} Q_n + Q_p &= 0.725 \text{ Btu/hr} \\ &= 0.725 \text{ Btu/hr} \times 252 \text{ cal/Btu} \\ &= 182.7 \text{ cal/hr, or} \\ &= 182.7 \text{ cal/hr} \times 24 \text{ hr/day} \\ &= 4384.8 \text{ cal/day} \end{aligned}$$

The heat transfer by radiation, $Q_r$, through an annular gap (3.46 cm$^2$ cross-sectional area) between absolute temperature limits of 294° K. (neckplug cap at ambient) and 77.4° K. (bottom of liquid nitrogen holding inner vessel) with an effective emissivity of 0.06 is, according to equation (2), 181.4 cal/day.

The combined heat transfer through necktube, neckplug and annular radiation cap (identical in both containers to be compared) is, therefore:

$$\begin{aligned} q &= (Q_n + Q_p) + Q_r \\ &= 4384.8 \text{ cal/day} + 181.4 \text{ cal/day} \\ &= 4566.2 \text{ cal/day} \end{aligned}$$

Inserting the numerical valves in equation (7), the ratio can now be expressed numerically $$\frac{Q_i'}{Q_i''} = \frac{Q_t' - q}{Q_t'' - q} = \frac{8291.7 \text{ cal/day} - 4566.2 \text{ cal/day}}{11088.9 \text{ cal/day} - 4566.2 \text{ cal/day}} = 0.57$$

Thus the improvement of the insulation of the container of the present invention employing a heat interceptor member and a thermoelectric heat pump in conjunction with a conventional state of the art container is:

$(1-0.57) \times 100 = 43\%$

This figure may be considered a new breakthrough in high performance insulation systems for double-walled containers for holding cryogenic liquids. Furthermore, this breakthrough is achieved in a structurally simple manner.

EXAMPLE II

A 29 liter test container was constructed similar to a conventional XR-16 container having the conventional three heat conductive shields thermally joined to the necktube and a heat interceptor member in conjunction with a thermoelectric heat pump in accordance with the present invention positioned between the outermost shield and the outer shell. All connections were similar to those of the foregoing described container. The direct current was provided by a conventional plug-in converter-rectifier. The container was filled with 29 liters of liquid nitrogen and the necktube was plugged and capped in a conventional manner. Conditions were as follows:

Evacuable space vacuum: about $6 \times 10^{-5}$ torr

Electric power to the thermoelectric heat pump: 2.52 amps D.C. at 8.3 volts.

Heat interceptor member temperature at contact with the cold end of the thermoelectric heat pump: $-54°$ C.

Heat interceptor member temperature at approximately the "equator" of the container $-48°$ C.

Outer shell temperature at contact with the hot end of the thermoelectric heat pump: 44° C. (center bottom of container).

Outer shell temperature half way between the center and the periphery of the bottom portion of the outer shell: 30° C.

Outer shell side wall temperature: 24° C.

Ambient temperature surrounding the container: 21° C.

The test container was positioned on a scale and over a 5 day period of loss of liquid nitrogen was 454 grams.

Therefore the normal evaporation rate was 90.8 grams/day. Since the weight of liquid nitrogen is 808.3 grams/liter, the holding time of the test container was:

$$\frac{29 \text{ liters} \times 808.3 \text{ grams/liter}}{90.8 \text{ grams/day}} = 258 \text{ days}$$

Compared to a conventional XR-16 container holding time of 211 days the improvement is:

$$\frac{100 (258 - 211) \text{ days}}{211 \text{ days}} = 22\%$$

This further demonstrates the improved capability of a cryogenic liquid container constructed in accordance with the present invention to reduce evaporation losses and improve holding times for cryogenic liquids over state of the art containers.

It is noteworthy that the use of three heat conductive shields in the container of Example II did not improve its overall performance compared with the performance of the container of the particular embodiment of the present invention in Example I which had only 2 heat conductive shields as hereinbefore described. Although not intended to limit the present invention, the most plausible explanation for this difference appears to be the fact that with the use of the actively refrigerated heat interceptor member, in accordance with the present invention, the evaporation rate of the cryogen is reduced. From this it follows that there is a smaller gaseous heat sink, egressing through the necktube, available to remove heat from the insulation via the heat conductive shields as hereinbefore described.

It is therefore possible that some heat from the necktube may have flown into the insulation instead of out of it via the third conductive shield, which would explain the overall higher evaporation rate of the container of the particular embodiment of the present invention in Example II compared with that of the container of the particular embodiment of the present invention in Example I.

Although preferred embodiments of the present invention have been described in detail, the use of heat interceptor member disposed within the insulation of a double-walled cryogenic container wherein a thermoelectric heat pump rejects heat intercepted by the heat interceptor member for dissipation to the ambient may be incorporated with many state of the art insulations. A plurality of heat interceptor members and thermoelectric heat pumps may be readily incorporated in a particular assembly. Likewise, a plurality of thermoelectric heat pumps may be thermally connected to a single heat interceptor member. Furthermore, the arrangement of the components of the present invention may be made in a variety configurations apparent to those skilled in the art. It is contemplated that modifications may be made within the spirit and scope of the invention.

What is claimed is:

1. A cryogenic liquid container comprising:
   (a) an inner vessel for holding cryogenic liquid;
   (b) an outer shell surrounding said inner vessel arranged and constructed with respect to said inner vessel so as to form an evacuable space therebetween;
   (c) insulation material disposed within and substantially filling said evacuable space; p1 (d) at least one high thermally conductive heat interceptor member disposed within and surrounded by said insulation material and oriented generally parallel to the inner vessel wall;
   (e) at least one thermoelectric heat pump within said evacuable space being positioned between said heat interceptor member (d) and said outer shell (b) and having a hot end facing said outer shell (b) and a cold end facing said heat interceptor member (d);
   (f) heat dissipation means for transferring heat from said hot end of (e) to the ambient surrounding said outer shell;
   (g) first high thermally conductive means within said evacuable space joining said hot end of (e) and said heat dissipation means (f); and
   (h) second high thermally conductive means within said evacuable space joining said cold end of (e) and said heat interceptor member (d); with
   (i) said thermoelectric heat pump (e), said first high thermally conductive means (g), said second high thermally conductive means (h) and said heat interceptor member (d) being constructed and arranged so that said heat interceptor member (d) assumes temperature lower than temperature assumed by said heat interceptor member (d) absent said construction and arrangement.

2. A container as recited in claim 1 wherein said outer shell (b) is constructed from a high thermally conductive material and comprises said heat dissipation means (f).

3. A container as recited in claim 1 wherein said heat interceptor member (d) substantially surrounds said inner vessel.

4. A container as recited in claim 1 wherein said heat interceptor member (d) is positioned normal to the flow of heat from the outer shell to the inner vessel.

5. A container as recited in claim 1 wherein said heat interceptor member (d) has a thermal conductivity of at least about 2 watt·cm$^{-1}$·K$^{-1}$ at about $-50°$ C. and a thickness of about 0.02 to 0.3 cm.

6. A container as recited in claim 1 wherein said heat interceptor member (d) comprises a metal selected from the group consisting of copper and aluminum.

7. A container as recited in claim 6 wherein said selected metal is aluminum.

8. A container as recited in claim 1 wherein said heat interceptor member (d) comprises a plurality of layers of thin metal foil.

9. A container as recited in claim 8 wherein said second high thermally conductive means (h) includes a heat collector member disposed within said layers of thin metal foil.

10. A container as recited in claim 9 wherein said heat collector member comprises a hemispherical high thermally conductive calotte and at least a portion of said second high thermally conductive means (h) is flexible.

11. A cryogenic liquid container comprising:
(a) an inner vessel for holding cryogenic liquid;
(b) a high thermally conductive outer shell surrounding said inner vessel arranged and constructed with respect to said inner vessel so as to form an evacuable space therebetween;
(c) a fluid conduit extending from the inner vessel to the outer shell to provide for egress of a heat absorbing fluid from the inner vessel;
(d) a composite multi-layered insulation material having low conductive material and radiant heat barrier material disposed within and substantially filling said evacuable space;
(e) at least one thin, non self-supporting flexible highly conductive metal shield disposed within said insulation material being coextensive with and supported by said insulation material said shield being secured to said fluid conduit (c) by low thermal resistance means at a region where temperature is lower than temperature assumed by said shield absent said securing so as to transfer heat from said shield to said fluid conduit (c);
(f) at least one high thermally conductive heat interceptor member comprising a plurality of layers of thin metal foil disposed within and surrounded by said insulation material positioned between said shield (e) and said outer shell (b), said heat interceptor member being oriented generally parallel to and substantially surrounding said inner vessel (a);
(g) at least one thermoelectric heat pump within said evacuable space being positioned between said heat interceptor member (f) and said outer shell (b) and having a hot end facing said outer shell (b) and a cold end facing said heat interceptor member (f);
(h) first high thermally conductive means within said evacuable space joining said hot end of (g) and said outer shell (b); and
(i) second high thermally conductive means within said evacuable space joining said cold end of (g) and said heat interceptor member (f) including a heat collector member disposed within said layers of said heat interceptor member (d); with
(j) said thermoelectric heat pump (g), said first high thermally conductive means (h), said second high thermally conductive means (i) and said heat interceptor member (f) being constructed and arranged so that said heat interceptor member (f) assumes temperature lower than temperature assumed by said heat interceptor member (f) absent said construction and arrangement by heat being transferred from said heat interceptor member (f) to said outer shell (b) for dissipation to the ambient by said outer shell (b).

12. A cryogenic liquid container having:
(a) an inner vessel for holding cryogenic liquid;
(b) a high thermally conductive outer shell surrounding said inner vessel arranged and constructed with respect to said inner vessel so as to form an evacuable space therebetween;
(c) a fluid conduit extending from the inner vessel to the outer shell to provide for egress of a heat absorbing fluid from the inner vessel;
(d) a composite multi-layered insulation material having low conductive material and radiant heat barrier material disposed within and substantially filling said evacuable space;
(e) at least one thin, non self-supporting flexible highly conductive metal shield disposed within said insulation material being coextensive with and supported by said insulation material said shield being secured to said fluid conduit (c) by low thermal resistance means at a region where temperature is lower than temperature assumed by said shield absent the securing so as to transfer heat from said shield to said fluid conduit (c);
wherein the improvement comprises:
(i) at least one high thermally conductive heat interceptor member comprising a plurality of layers of thin metal foil disposed within and surrounded by said insulation material positioned between said shield (e) and said outer shell (b), said heat interceptor member being oriented generally parallel to and substantially surrounding said inner vessel (a);
(ii) at least one thermoelectric heat pump within said evacuable space being positioned between said heat interceptor member (i) and said outer shell (b) and having a hot end facing said outer shell (b) and a cold end facing said heat interceptor member (i);
(iii) first high thermally conductive means within said evacuable space joining said hot end of (ii) and said outer shell (b); and
(iv) second high thermally conductive means within said evacuable space joining said cold end of (ii) and said heat interceptor member (i) including a heat collector member disposed within said layers of said heat interceptor member (i); with
(v) said thermoelectric heat pump (ii), said first high thermally conductive means (iii), said second high thermally conductive means (iv) and said heat interceptor member (i) being constructed and arranged so that said heat interceptor member (i) assumes temperature lower than temperature assumed by said heat interceptor member (i) absent said construction and arrangement by heat being transferred from said heat interceptor member (i) to said outer shell (b) for dissipation to the ambient by said outer shell (b).

* * * * *

UNITED STATES PATENT AND TRADEMARK OFFICE
CERTIFICATE OF CORRECTION

PATENT NO. : 4,287,720

DATED : September 8, 1981

INVENTOR(S) : Alfred Barthel

It is certified that error appears in the above—identified patent and that said Letters Patent is hereby corrected as shown below:

Column 11 - line 16

"19" should read "18"

Signed and Sealed this

Twenty-ninth Day of December 1981

[SEAL]

Attest:

GERALD J. MOSSINGHOFF

*Attesting Officer*   *Commissioner of Patents and Trademarks*